United States Patent [19]

Floyd et al.

[11] Patent Number: 4,683,001
[45] Date of Patent: Jul. 28, 1987

[54] ONE STEP DRY-AND-SHINE POLISHING CLOTH

[75] Inventors: David T. Floyd; Garry L. Shanklin, both of Outagamie County; Gordon E. Lynch, Winnebago County; Gary H. Meitner, Winneconne, all of Wis.

[73] Assignee: Kimberly-Clark Corporation, Neenah, Wis.

[21] Appl. No.: 768,905

[22] Filed: Aug. 23, 1985

[51] Int. Cl.$^4$ .............................................. C09G 1/00
[52] U.S. Cl. ..................... 106/3; 15/104.93; 106/10; 106/11; 106/309
[58] Field of Search ................ 106/3, 10, 11, 271, 106/309; 15/104.93

[56] References Cited

U.S. PATENT DOCUMENTS

| | | | |
|---|---|---|---|
| 1,852,114 | 4/1932 | Green | 15/104.93 |
| 1,994,425 | 3/1935 | Weller | 91/62.5 |
| 2,098,966 | 1/1937 | Kingman | 91/54.7 |
| 2,101,072 | 12/1937 | Kingman | 401/132 |
| 2,205,063 | 6/1940 | Hester | 15/104.93 |
| 2,618,803 | 11/1952 | Parmet | 15/209 |
| 2,839,774 | 6/1958 | Rand | 401/18 |
| 2,961,678 | 11/1960 | MacLellan et al. | 15/104.93 |
| 3,334,373 | 8/1967 | van Loo | 252/91 |
| 3,912,667 | 10/1975 | Spitzer et al. | 106/170 |
| 3,965,518 | 6/1976 | Muoio | 106/11 |
| 3,965,519 | 6/1976 | Hermann | 15/104.93 |
| 4,013,475 | 3/1977 | Liebowitz et al. | 106/10 |
| 4,481,243 | 11/1984 | Allen | 428/154 |

Primary Examiner—Paul Lieberman
Assistant Examiner—Willie J. Thompson
Attorney, Agent, or Firm—Paul A. Leipold; Donald L. Traut; Jerremiah J. Duggan

[57] ABSTRACT

The invention is generally accomplished by providing a cloth which is coated or impregnated in a discontinuous manner with a polish composition. The polish composition comprises a silicone oil, a detergent and soap or wax. In a particularly preferred form, the cloth comprises a polypropylene meltblown material that has been treated with a surfactant, and the wax is a combination of saponified and non-saponified waxes. The polishing wipe further may have added thereto antistatic agents, UV absorbers and mineral oil.

27 Claims, 5 Drawing Figures

ONE STEP DRY-AND-SHINE POLISHING CLOTH

TECHNICAL FIELD

This invention relates to a disposable dry-and-shine polishing cloth. The invention particularly relates to a disposable wiper for drying and waxing automobiles.

PRIOR ART

There has been a variety of products marketed for the polishing of cars. These have comprised liquid waxes that may be wiped onto a car and then after drying are buffed to a shine. It is also known that there are solid waxes that are applied by wiping a cloth on the wax to transfer wax to the cloth and then applying the wax to the car. After drying, these solid waxes are also buffed to a shine. It is also known that auto polishes may be formed utilizing silicone oil rather than wax. Such polishes do not require buffing; however, they do not form a long-lasting protective coating on the car.

U.S. Pat. No. 3,965,518—Muoio—discloses a disposable impregnated wiper for treatment of household furnishings. The wiper is a cellulosic substrate having a bonding material impregnated in a fine pattern on the surface. The polish is an oil and water emulsion having an internal phase of mineral oil and silicone fluid that serves as a furniture polish. U.S. Pat. No. 3,965,519—Hermann—discloses a disposable floor wipe. The floor wipe of Hermann comprises a substrate impregnated with a floor polish.

U.S. Pat. No. 2,098,966—Kingman—discloses a polishing pad with wax held in grooves or channels of a pad. The pad is covered with a cellophane wrapper in order to preserve the wax from drying out. U.S. Pat. No. 1,994,425—Weller—is a waxing pad suitable for automobiles. The wax-applying face of the pad has the wax applied in ribbons to the sheet.

There remains a need for a polishing wipe for automobiles that will provide a wax polish but not require buffing. Further, it would be advantageous if the polishing wipe also could be utilized to dry the car after washing when waxing of a car is most likely to be done.

BRIEF DESCRIPTION OF THE INVENTION

An object of this invention is to overcome the disadvantages of the prior polishing wipes.

An additional object of this invention is to provide a wipe that will dry and polish an automobile.

A further object is to provide a wipe that will dry, polish and shine an automobile, providing a wax coat without a need for buffing.

An additional object of this invention is to provide a disposable wipe that is low in cost and provides wax polish to an automobile simultaneously with drying the automobile.

These and other objects of the invention are generally accomplished by providing a cloth which is coated or impregnated or otherwise filled in a discontinuous manner with a polish composition. The cloth then has hydrophobic areas of polish composition and hydrophilic areas of cloth. The polish composition comprises a silicone oil, a detergent or soap, and wax. In a particularly preferred form, the cloth comprises a polypropylene meltblown material that has been treated with a surfactant, and the wax is a combination of saponified and non-saponified waxes. The polishing wipe further may have added thereto antistatic agents, UV absorbers and mineral oil.

MODES FOR CARRYING OUT THE INVENTION

The polishing wipe of the instant invention has numerous advantages over prior art wipes. The wipe of the invention allows an automobile to be both dried and waxed at the same time. Further, this is accomplished without buffing. The polishing wipe of the invention does not require hard polishing. The wipe of the invention also is disposable and low in cost. The wipe of the invention allows a wax polish to be placed without buffing whereas other wax polishing methods require a two-step treatment process. These and other advantages of the invention will be apparent from the detailed description below.

Figure 1:
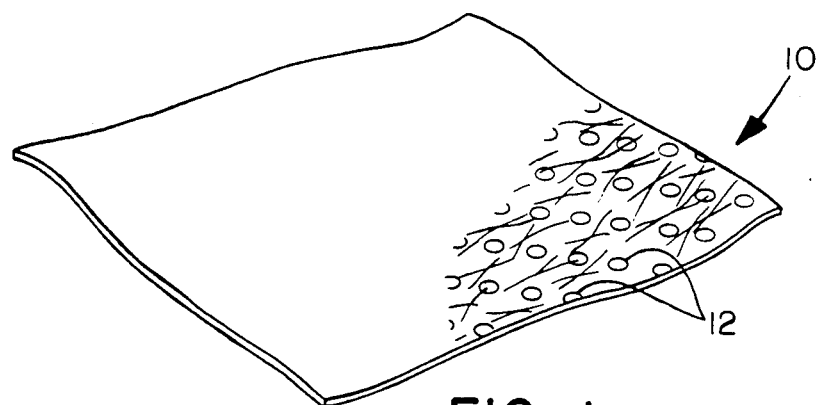
FIG. 1 is a view of a wipe in accordance with the invention.

FIG. 1 is a view of a wipe in accordance with the invention that has applied thereto a discontinuous pattern of the polishing material of the invention. The wipe 10 has a pattern of waxy areas 12 that are generally in the form of dots applied to the sheet and largely absorbed therein.

Figure 2:
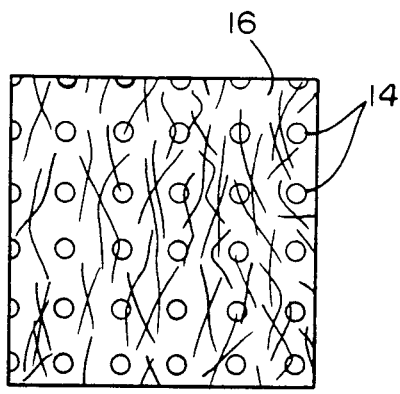
FIGS. 2 and 3 are greatly enlarged planar views of two forms of substrates usable in the invention.

FIG. 2 has an alternate pattern in which the areas of polishing compound 14 are arranged in a pattern of straight rows on substrate 16.

Figure 3:
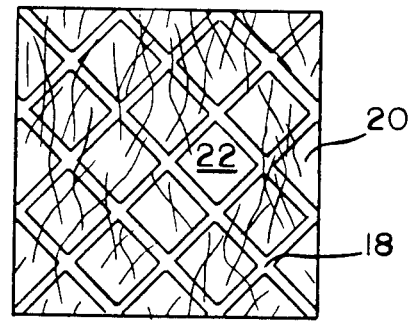

FIG. 3 illustrates a pattern in which a crosshatch arrangement 18 of the wax polishing compound is arranged onto substrate 20, leaving open areas 22 between the crosshatched pattern 18.

Figure 4:
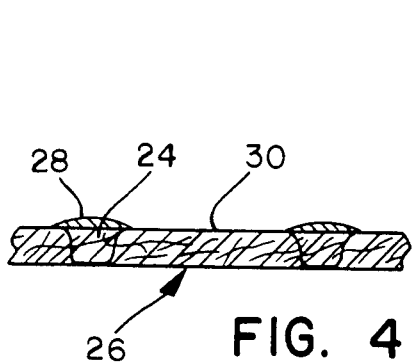
FIG. 4 is a cross section of a wipe impregnated from one side.

FIG. 4 illustrates in partial cross section a sheet in accordance with the invention in which the wax polishing compound 24 is applied in a dot pattern that is largely soaked into sheet 26. However, a small deposit of the material 28 remains on the surface 30 of sheet 26.

Figure 5:
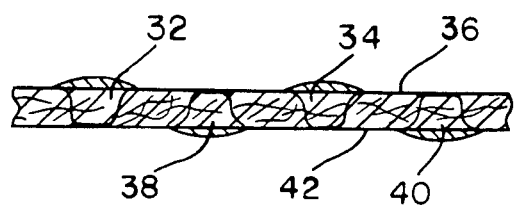
FIG. 5 is a partial cross section of a wipe in accordance with the invention wherein the wipe has been impregnated from both sides.

FIG. 5 illustrates a partial cross section of a wipe in accordance with the invention that has been impregnated from both sides. Areas 32 and 34 have been impregnated from surface 36 whereas areas 38 and 40 have been impregnated from the opposite surface 42.

While illustrated in FIGS. 1, 2, and 3 with three different patterns of waxy material, the invention may be practiced with any desired pattern of application of the material to the substrate. Further, it is possible that the material could be placed within the sheet as a powder or encapsulated area that does not extend to the surface. As the polish of the invention is dispersed and applied when wet, the polish does not need to be present at the surface of the dry cloth. The selection of a pattern for wax polish material is a matter of choice. Generally, an amount of coverage of the wiper with polish is less than about 50 percent. The areas not containing polish are hydrophilic and pick up water from the surface to be dried and polished. The polish areas are hydrophobic and do not absorb water, although they dissolve in the combined water and impregnated soap or detergent. The preferred range is between about 9 and about 25 percent coverage on each side of the wipe for good polishing without having excess wax that will not be utilized in the disposable wipe or will inhibit the absorption of moisture onto the wipe.

The one-step polishing wipes of the invention may be used in the following manner to polish an automobile. Wash the automobile, rinse with clear water and leave wet. Using the wipe of the invention, sweep excess water off the automobile surface, saturating the wipe with water while doing so. Gently wring the excess water out of the wipe. Dry the automobile surface, turning the wipe frequently and wringing out the excess moisture. For best results, do not use on hot surfaces. Best results are obtained when automobile is washed and waxed in the shade.

The weight of waxing material added to the wipe may be any range that gives a good polish or shine to a painted substrate when the wet wipe is utilized for this purpose. A suitable amount of add-on weight has been found to be in the range of between about 2 percent and about 20 percent of the total dry polishing wipe weight. By dry weight of the wipe it is intended to mean the wipe after application of the polishing compound to the cloth and drying to remove any carrier for the polishing compound. The preferred amount is found to be between about 4 percent and about 15 percent by weight of the total dry polishing wipe. This amount of add-on is preferred as it does not greatly inhibit the absorption of liquid by the wipe. Further, it provides enough polish for effective use of the disposable rag for one polishing. Higher loadings of polish cause the wax to be more likely applied as a waxy deposit needing buffing. Lower amounts may not apply evenly and may leave streaks.

The cloth forming the substrate of the wiper of the invention may be any suitable woven or nonwoven material. Typical of such materials are natural and artificial fiber woven cloths such as cotton or blends of cotton and polyester. A suitable material has been found to be a meltblown nonwoven material. Particularly preferred has been found to be an unbonded meltblown polypropylene base web having a basis web in the weight range of between 1 oz. per square yard and about 6 oz. per square yard. The polypropylene typically is treated with a suitable surfactant to render it water absorbent. Suitable surfactants are polyoxyethylene (13) octyphenyl ether and di-(2-ethylhexyl)sodium sulfosuccinate. This material has been found to be particularly preferred as it is low in cost, soft, highly-absorbent, and contains no harsh materials that can scratch or damage the surface that is being wiped. The meltblown polypropylene further is desirable in that it allows discrete isolated spots of the wax/silicone material of the invention to be formed on the web with minimum migration such that the web does not become nonabsorbent or nonwettable. The meltblown polypropylene further conforms to the surface very well and is believed to aid in some way in release of the wax from the substrate in a better manner than a cellulose substrate as it does not bond to the polishing composition.

The weight of the cloth material of the wipe of the invention may be any suitable material that is conformable, nonabrasive and of sufficient strength. Generally a nonwoven polypropylene fabric of between about 1 oz. per square yard and about 6 oz. per square yard is suitable. A preferred base nonwoven polypropylene material is between about 1.5 and about 4 oz. per square yard for a material strong enough to be suitable for wiping and low enough in cost to be disposable. The wipe of the invention is water absorbent or hydrophilic such that after being impregnated or coated with the polishing composition the wipe still may absorb between 200 and 800 percent of its weight of water. The high water absorption is necessary to the invention as the action of the water with detergent or soap disperses the wax for application to the substrate.

The method of applying the polishing material to the cloth of the wipe of the invention may be any suitable means. Typical means for applying the coating are spraying, hot-melt printing, flexographic printing or screen printing. It is also within the invention that the material could be applied as a particle that is formed in the web when it is air-formed. A particularly preferred printing method is printing with a gravure roll, as it is easily controlled and low in cost.

The polishing compound of the invention is such that it allows the one-step drying and polishing of an automobile or other surface to be polished. The polishing composition of the invention contains wax, silicone oil, and detergent or soap. The wax preferably is a blend of highly saponifiable wax and a relatively non-saponifiable wax. The easily saponified wax is dispersed in the water and detergent or soap system while the non-saponifiable wax is easily dispersed in the saponified wax. This permits both waxes to be dispersed in the system and to be uniformly applied to the substrate. The highly saponifiable waxes may be from the groups including vegetable waxes such as Bayberry and Japan and mineral waxes such as Montan or oxidized Montan. The relatively non-saponifiable wax may be selected from the animal waxes such as beeswax; vegetable waxes such as Carnauba, Candelilla, Ouricury; or mineral waxes such as Ozokerite, Ceresine, Paraffin or Microcrystalline waxes. The preferred waxes are oxidized Montan wax as the highly saponifiable wax, and Carnauba as the relatively non-saponifiable wax as a combination of these waxes results in a wax coat of high gloss and hard finish. Further, these waxes are relatively low in cost.

The ratio of saponifiable wax to non-saponifiable wax may be any desired amount. A preferred ratio of saponifiable wax to non-saponifiable wax is between about 1 to 2 and about 4 to 1. The waxes generally comprise between about 5 and about 50 percent of the dry polishing composition printed on the cloth. A preferred amount of wax is between about 10 and 30 percent of the dry polishing composition for a good shine without streaks.

The silicone oils are added to the composition of the invention in order to add gloss and spreadability to the polishing compound. The silicone oils, such as dimethyl silicones, used in the composition of the invention generally have viscosities of between about 100 cs. to about 10,000 cs. The silicone oils may comprise between about 5 and about 90 percent of the dried polishing composition applied to the cloth in a printing operation. A preferred amount is between about 25 and about 75 percent for good spreadability and gloss.

The detergent or soap utilized in the invention may be any suitable soap or detergent that will aid in dispersion of the waxes when combined with water. Generally a fatty acid in combination with an amine/alkali to form a soap is suitable. Typical fatty acids are those consisting of palmitic acid, stearic acid, oleic acid, and linoleic acid. The amine/alkalis may be selected from amines, sodium hydroxide, potassium hydroxide, or ammonium hydroxide. The detergent or soap suitable is present in an amount of between about 10 and about 50 percent of the dried printing composition. The preferred amount is between about 15 and about 35 percent to disperse the waxes adequately.

In addition to the silicone oils, waxes, and detergent or soap, the washing composition may also contain known additives for polishes such as antistatic agents and UV absorbers or screens. A suitable antistatic agent may be a modified ethosulfate quaternary with a chain length of between 6 and 18 carbons. UV absorbers typically may be selected from the benzophenones, benzotriazoles, p-Aminobenzoic Acid esters and derivatives, salicylate derivatives, methoxycinnamates, and diphenyl acrylates. The UV absorbers and antistatic agents are generally present as less than 1 percent of a printing composition.

The application of the polishing compound to the cloth substrate may require the addition of solvents and viscosity control materials to allow the printing of the polishing compound utilizing the particular apparatus required. Typical of such materials are water and Isopropanol. The solvents generally are present as greater than 10 percent by weight of the solvent printing solution. Water may be used in an amount of between about 0 to about 40 percent of the printing composition applied to the cloth. Alcohol, such as Isopropanol, may be used in an amount of about 0 to 60 percent of this printing composition. The water and alcohol are largely evaporated after printing of the pattern on the substrate. Hot-melt printing does not generally require the use of the viscosity control agents.

If solid particles are utilized by addition during air forming, the use of solvents would not be necessary, and the waxes probably would be placed as particles or would be coated onto a carrier such as a particle of polymer for adding to the air-forming stream.

The polish may be additionally applied by a hot-melt apparatus as either an extruded or a printed discontinuous coating. As such, the use of solvents would not be necessary, and the waxes would be applied in the molten or softened form.

The following examples are intended to illustrate the process. Parts are in percent by weight, unless otherwise indicated.

EXAMPLE 1

There is provided an 18-inch web of polypropylene meltblown web. The web material is not embossed or bonded and has a weight of about 2.4 oz. per square yard. The web is run through a rotogravure where the pattern of polish is printed on one side of the web in a pattern as illustrated in FIG. 1. A gravure roll has holes onto which the waxy composition is applied with a doctor blade. The rotogravure roll is pressed into the cloth at ambient temperature with a linear speed of about 100 ft./min. The material is dried with hot air in a tunnel oven at a temperature of about 150° F. for approximately one minute to remove volatiles and becomes dry to the touch. The web is then rolled up, slit into wipes of about 19-inch length. The wipers of about 18"×19" containing 5 percent polishing compound based on total wipe weight are used to wax a recently-washed car, the recently-washed car still having wet portions. After the car had been wiped with the wipe to dry and polish the car, it was sprayed with water, and the water beaded up indicating a wax coat had been applied. The composition of the polish applied by the rotogravure roll is as follows:

| Ingredients | % W/W | |
|---|---|---|
| *Silicone fluid SWS-101,100 cs. | 10.75 | |
| *Silicone fluid SWS-101,1000 cs. | 8.06 | 21.5 |
| *Silicone fluid SWS-101,10,000 cs. | 2.69 | |
| Hoechst wax S (oxidized Montan wax) | 5.38 | |
|  |  | 8.96 |
| #1 Carnauba wax | 3.58 | |
| Oleic Acid (fatty acid - soap former) | 5.38 | |
| Larostat 264-A (35%) - (quaternary ethosulfate - antistat) | 0.10 | |
| Cyasorb UV 24 - (benzophenone - UV inhibitor) | 0.10 | |
| Morpholine (amine - soap former) | 5.02 | |
| Water (carrier) | 28.44 | |
| Isopropanol (carrier) | 30.50 | |

*dimethyl silicone fluids

EXAMPLE 2

The process of Example 1 was repeated except a second rotogravure roll is utilized to apply a second dot pattern on the opposite side of the cloth. The percent polishing compound in the air-dried wipe is about 12 percent by weight of the total weight of the wipe. The wipe produced a hard, bright wax finish when utilized to polish a car.

EXAMPLE 3

| Ingredients | % W/W |
|---|---|
| Silicone Fluid SWS-101,100 cs | 16.83 |
| Silicone Fluid SWS-101,1000 cs | 12.60 |
| Silicone Fluid SWS-101,10000 cs | 4.23 |
| Hoechst Wax S | 8.45 |
| #1 Carnauba Wax | 5.65 |
| Oleic Acid | 8.45 |
| Larostat 264-A | 0.32 |
| Cyasorb UV 24 | 0.16 |
| BHA | 0.8 |
| Morpholine | 7.90 |
| Water | 29.75 |
| Isopropanol | 4.70 |
| FD & C Red #4-1% in 50% Water/50% Isopropanol | 0.64 |
| FD & C Yellow #5-1% in 50% Water/50% Isopropanol | 0.15 |
| FD & C Blue #1-1% in 50% Water/50% Isopropanol | 0.09 |
|  | 100.00 |

The above formulation was applied to 16"×18" sheets of 2.4 oz./sq. yd. unbonded meltblown polypropylene by a screen printing process.

The screen printing process utilizes a porous woven screen, the surface of which has been rendered impervious except in discreet discontinuous areas to form a pattern.

Meltblown sheets were placed beneath the printing screen. The polish composition, with a viscosity of 7000 cps, was applied to the top of the screen and was pulled across the pattern with a squeegee. The polish was applied to the meltblown through the open pattern areas of the screen.

The solvents were evaporated from the printed sheets in an oven until the sheets were dry to the touch.

After drying, the reverse side of the sheets were printed in the same manner as the first side.

The printed wipers, containing 18.5% polishing compound, were used to polish a recently-washed car still having wet portions. The wiper produced a hard, bright finish that repelled water.

EXAMPLE 4

This example sets forth a process that may be used to form wipes with application of the polishing composition to the cloth by a hot-melt method.

| Ingredients | % W/W |
|---|---|
| SWS-101-100 | 16.00 |
| SWS-101-1000 | 20.00 |
| SWS-101-10000 | 2.00 |
| Hoechst Wax S | 16.50 |
| Carnauba | 7.60 |
| Sodium hydroxide 50% (alkali) | 16.20 |
| Sandoxylate FS-9 (detergent) | 12.15 |
| PARSOL MCX (octyl methoxycinnimate) | 0.20 |
| Ceraphyl 60 (quaternary amine) | 0.30 |
| Water | 9.05 |
|  | 100.00 |

The above formula is a thick paste at room temperature but becomes liquid at elevated temperatures.

The above composition is applied to one side of a 16-inch wide roll of unbonded polypropylene meltblown with a hot-melt apparatus at 250° F. The roll is then cut into 22-inch long wipes. Total polish add-on is about 4.9% by weight of the wipe.

The wipe is applied to dry and shine a recently-washed car, and a glossy water-repellent finish resulted.

The above examples are intended to be illustrative and not exhaustive of the polishing wipes that may be made in accordance with the invention. For example, while the wipes have been described with reference to polishing of automobiles, they also could be utilized for polishing other painted surfaces such as tractors, metal buildings, fixed machines, painted furniture or painted wood. Further, while described with application of the wax in a pattern to the cloth, it is within the invention to provide the wiper with a coating of the polishing compound in a random manner rather than in a pattern, as long as the amount of coverage set forth in the above disclosure was not exceeded.

What is claimed is:

1. A drying and polishing wipe that simultaneously dries and polishes a wet surface comprising an absorbent cloth partially filled in discontinuous areas with a polishing composition comprising a mixture of saponified and nonsaponified waxes, silicone oil and detergent or soap wherein said cloth having discontinuous areas of polishing composition will provide a hydrophobic covering in said discontinuous areas thereby causing said wipe to not absorb water in said discontinuous areas but said wipe will absorb water in areas other than said discontinuous areas.

2. The polishing wipe of claim 1 wherein said polishing composition further comprises an antistatic agent.

3. The polishing wipe of claim 1 wherein said polishing composition further comprises a UV screen.

4. The polishing wipe of claim 1 wherein said polishing composition further comprises a mineral oil.

5. The wipe of claim 1 wherein said cloth comprises nonwoven polyolefin fibers.

6. The polishing wipe of claim 1 wherein said polishing composition is present in an amount between about 4 and about 15 percent by weight of the total weight of the dry polishing wipe.

7. The polishing wipe of claim 1 wherein said cloth is coated to provide partial coverage of between about 9 and about 25 percent of the surface area of said wipe with said polishing composition.

8. The polishing wipe as in claim 1 wherein said wipe, when partially coated with said polishing composition, can absorb up to about 200 to 800 percent of its weight in water.

9. The polishing wipe of claim 1 wherein said cloth comprises nonwoven polypropylene fibers treated with a surfactant.

10. The polishing wipe of claim 1 wherein said cloth has a weight of between about 1.5 oz. per square yard and about 6 oz. per square yard.

11. The wipe of claim 1 wherein said wax comprises a mixture of Montan wax and Carnauba wax.

12. The wipe of claim 1 wherein said polishing composition comprises about 25 to about 75 percent silicone oil, about 10 to about 30 percent wax and about 15 to 35 percent by weight soap or detergent.

13. A method of forming a drying and polishing wipe that simultaneously dries and polishes a wet surface comprising providing an absorbent cloth, printing a discontinuous pattern of a polishing composition comprising a soap or detergent, a mixture of saponified and nonsaponified waxes and silicone oil onto said cloth wherein said cloth having discontinuous areas of polishing composition will provide a hydrophobic covering in said discontinuous areas thereby causing said wipe to not absorb water in said discontinuous areas but said wipe will absorb water in areas other than said discontinuous areas.

14. The method of claim 13 wherein said printing is carried out by doctoring said polishing composition into holes in a roller and pressing said roller against the cloth in a rotogravure process.

15. The method of claim 13 wherein said polishing composition further contains solvents and the method further includes the removal of solvents by heating after application to said cloth.

16. The method of claim 13 wherein said printing comprises screen printing.

17. The method of claim 13 wherein said polishing composition is applied to said cloth as a hot melt.

18. The method of claim 15 wherein said solvents comprise greater than 10 percent by weight of the printing composition and wherein said solvents comprise alcohol in an amount of between 0 and 40 percent by weight of the printing composition and water in an amount of between 5 and 60 percent by weight of said printing composition.

19. The method of claim 13 wherein said printing covers between about 9 and about 25 percent of the surface of each side of said wipe.

20. A method of simultaneously drying and polishing a painted surface comprising washing said surface, rinsing said surface, contacting said wet surface with a polishing wipe comprising an absorbent cloth partially filled in discontinuous areas with a polishing composition comprising saponified and nonsaponified waxes, silicone oil, and detergent or soap, wringing excess rinse water from said wipe and wiping said surface until it is dry and provided with a hard, bright wax coating wherein said cloth having discontinuous areas of polishing composition will provide a hydrophobic covering in said discontinuous areas thereby causing said wipe to not absorb water in said discontinuous areas but said wipe will absorb water in areas other than said discontinuous areas.

21. The method of claim 20 wherein said cloth comprises surfactant-coated polypropylene and said polishing composition is present in an amount of between about 4 and about 15 percent by weight of the total weight of the dry polishing cloth.

22. The wipe of claim 1 wherein said cloth comprises a meltblown polypropylene of about 1.5 to about 4 oz. per square yard.

23. The method of claim 13 wherein said cloth comprises a meltblown polypropylene of about 1.5 to about 4 oz. per square yard.

24. The method of claim 20 wherein said cloth comprises meltblown polypropylene of about 1.5 to about 4 oz. per square yard.

25. The wipe of claim 22 wherein said cloth has a weight of about 2.4 oz.

26. The wipe of claim 1 wherein said discontinuous areas comprise less than 50 percent coverage of said wipe.

27. The method of claim 13 wherein said discontinuous areas comprise less than 50 percent coverage of said wipe.

* * * * *